3,284,108
PIPE JOINT
Walter H. West, Bay City, Mich., assignor to The Dow Chemical Company, Midland, Mich., a corporation of Delaware
Filed Aug. 27, 1965, Ser. No. 483,055
2 Claims. (Cl. 285—55)

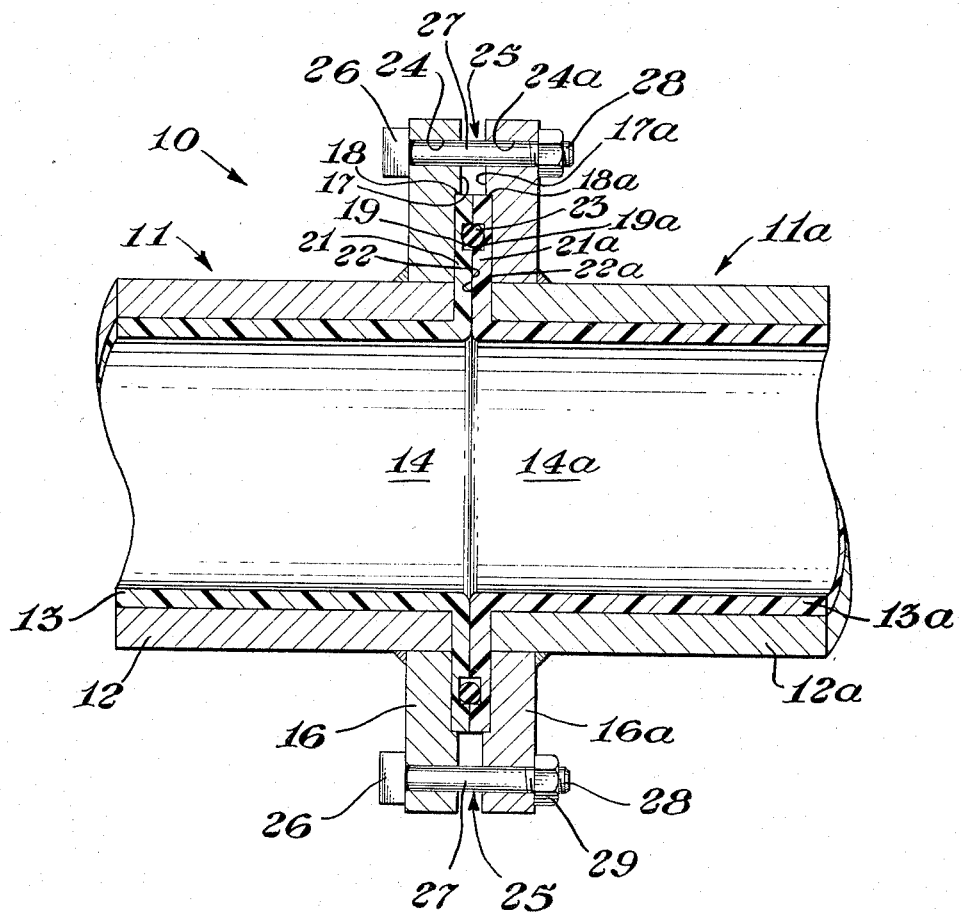

This invention relates to an improved pipe joint and more particularly relates to an improved pipe joint for synthetic resinous thermoplastic lined pipes.

Considerable difficulty has been encountered in the joining of sections of rigid pipelines with synthetic resinous thermoplastic materials wherein the pipe or outer jacket of the pipe is provided with a flange having a radially extending face. A portion of the lining material is conformed to the radially extending face and pipe sections terminated in this manner are placed in abutting relationship and held together by means of bolts passing through suitable matching apertures in the flanges. Many synthetic resinous thermoplastic materials exhibit the characteristic of cold flow which, after a time, results in the requirement that the bolts be retightened, or in the absence of such tightening, the joint becomes leaky.

It would be beneficial if there were available an improved pipe joint for thermoplastic resinous lined pipes.

It would be further advantageous if there were available a joint for pipes lined with synthetic resinous thermoplastic materials subject to cold flow which would provide an essentially leak-proof joint which would not require frequent retightening.

Further, it would be advantageous if there were available a leak-proof joint for pipes which have a thermoplastic resinous lining subject to cold flow which is easily assembled and disassembled.

These benefits and other advantages in accordance with the present invention are achieved in a joint between adjacent pipe sections, each of the pipe sections comprising an outer rigid body and a lining of a synthetic resinous material subject to cold flow, each of the pipe sections having a terminal end to be joined, a flange affixed to the rigid outer layer of the pipe and defining a generally outwardly extending radial surface, means to secure adjacent flanges to each other, a terminal flange of synthetic thermoplastic resinous material integral with the lining and extending along the radially outwardly extending face of the flange, the terminal flange defining an annular groove within the outwardly extending surface, an O-ring of a resilient non-thermoplastic material disposed at least partially within adjacent annular grooves of adjacent flanges, the O-ring being disposed adjacent the outer terminal portion of the synthetic resinous flanges.

These features and other benefits in accordance with the present invention will become more apparent from the following specification when taken in connection with the drawing wherein:

The figure illustrates a pipe joint in accordance with the present invention generally designated by the reference numeral 10.

The pipe joint 10 comprises in cooperative combination a first pipe section 11 and a second pipe section 11a. The pipe sections or conduits 11 and 11a are substantially identical and identical parts are identified in the drawing by the suffix "a" affixed to the appropriate reference numeral. The conduit 11 comprises an outer cylindrical conduit 12 of steel or like rigid material having disposed on the inner surface thereof a synthetic resinous thermoplastic lining 13. The conduit 11 has a terminal end 14. A flange 16 is affixed to the rigid portion of the conduit 12. The flange 16 defines a generally radially outwardly extending surface 17. The flange 16 also defines within the surface 17 a generally annular shoulder 18. The thermoplastic resinous lining 13 terminates in a thermoplastic terminal flange 21 which conforms generally to the configuration of the surface 17 between the annular shoulder 18 and the inner portion of the flange 16. The flange 21 defines an annular groove 19 in a surface 22 of the flange 21 remote from the surface 17 and generally adjacent the shoulder 18 of the flange 16. An O ring 23 is in sealing engagement with the surfaces of the flanges 21 and 21a defining the grooves 19 and 19a. The flange 16 defines a plurality of apertures 24. The apertures 24 are adapted to mate with like apertures 24a in the adjacent flange 16a. A plurality of compression means or bolts 25 are disposed within the apertures 24 and 24a. The bolts 25 comprise a head portion 26, a body portion 27, an externally threaded portion 28 and a nut 29 having mating internal threads, not shown, which serve to draw the flanges 16 and 16a together and subsequently force the thermoplastic resinous flanges 21 and 21a into sealing engagement with and compressing the O-ring 23.

When a joint such as the joint 10 is prepared and tightened, the pressure from the inside of the conduit and the compression force exerted by the bolts 25 tend to cause cold flow of the thermoplastic flanges 21, the thermoplastic flanges 21 are drawn together compressing the O-ring and causing the face of opposed flanges 21 to effect a double seal at the joint interface. Any leakage caused by movement of the thermoplastic flanges 21 due to internal pressure within the conduit is effectively halted by the resilient O-ring and as the O ring material is forced against the flanges 21 and 21a, the seal becomes more and more secure. The inwardly facing shoulders 18 and 18a of the flanges 16 and 16a beneficially retard movement of the flanges 21 and 21a in a radially outward direction.

Steel pipes lined with synthetic resinous materials such as saran (a copolymer of about 85 percent vinylidene chloride and about 15 percent vinyl chloride) exhibit excellent leak-proof joints when conventional rubber O-rings are employed substantially in accordance with the figure.

Similar beneficial results are achieved when materials such as polyethylene, polypropylene, nylon and a polyether composition sold commercially under the trade name of Penton are employed as linings for steel pipes and used in accordance with the present invention.

As is apparent from the foregoing specification, the method and apparatus of the present invention is susceptible of being embodied with various alterations and modifications which may differ particularly from those that have been described in the preceding specification and description. For this reason, it is fully understood that all of the foregoing is intended to be merely illustrative and is not to be construed interpreted as being restrictive or otherwise limiting of the present invention, excepting as it is set forth and defined in the hereto-appended claims.

What is claimed is:
1. A pipe joint between adjacent pipe sections, each of the pipe sections comprising an outer rigid body and a lining of a synthetic resinous material subject to cold flow, each of the pipe sections having a terminal end to be joined, a flange affixed to the rigid outer layer of each pipe section and defining a generally outwardly extending radial surface, means to secure adjacent flanges to each other, a terminal flange of synthetic thermoplastic resinous material integral with the lining in each pipe section and extending along the radially outwardly extending face of the affixed flange, each terminal flange having an annular groove of substantially the same radius within the outwardly extending surface, an O-ring of a resilient sealing material disposed in said grooves, the axial depth of each of the grooves being less than the radius of the O-ring cross-section, the grooves being disposed adjacent the outer terminal portion of the synthetic resinous flanges said securing means drawing said flanges together to compress said O-ring and the terminal flanges to thereby effect a double seal at said joint interface.

2. The joint of claim 1 wherein each of the flanges defines an inwardly facing shoulder engaging the adjacent terminal flange.

References Cited by the Examiner

UNITED STATES PATENTS

| | | | |
|---|---|---|---|
| 2,383,089 | 8/1945 | Theiler | 285—336 |
| 2,568,414 | 9/1951 | Russ | 285—55 |
| 2,998,984 | 9/1961 | Gressel | 285—55 |
| 3,199,879 | 8/1965 | Fleming | 285—55 |

FOREIGN PATENTS

| | | |
|---|---|---|
| 883,048 | 3/1943 | France. |
| 1,115,387 | 12/1955 | France. |
| 793,960 | 4/1958 | Great Britain. |
| 810,400 | 3/1959 | Great Britain. |

CARL W. TOMLIN, *Primary Examiner.*

EDWARD C. ALLEN, *Examiner.*

R. GIANGIORGI, *Assistant Examiner.*